United States Patent [19]

Santerelli

[11] Patent Number: 4,838,461

[45] Date of Patent: Jun. 13, 1989

[54] DISPENSING PACKAGE FOR A VISCOUS PRODUCT

[75] Inventor: James E. Santerelli, Toledo, Ohio

[73] Assignee: Owens-Illinois Closure Inc., Toledo, Ohio

[21] Appl. No.: 181,343

[22] Filed: Apr. 14, 1988

[51] Int. Cl.⁴ ............................................. G01F 11/00
[52] U.S. Cl. ................................... 222/259; 222/383; 222/385; 222/391; 222/341
[58] Field of Search ............................ 222/256–257, 222/259–260, 383, 386, 391, 385, 340, 341, 387

[56] References Cited

U.S. PATENT DOCUMENTS

| | | | |
|---|---|---|---|
| 3,159,317 | 12/1964 | Mini | 222/385 X |
| 3,268,123 | 8/1966 | Spatz | 222/259 X |
| 4,413,759 | 11/1983 | Mettenbrink | 222/213 |
| 4,437,584 | 3/1984 | Connors et al. | 222/391 X |
| 4,437,591 | 3/1984 | von Schuckmann | 222/391 |
| 4,461,403 | 7/1984 | Prahs | 222/129 |
| 4,479,592 | 10/1984 | Rusing et al. | 222/391 X |
| 4,503,997 | 3/1985 | Corsette | 222/385 |
| 4,673,106 | 6/1987 | Fishman | 222/391 X |
| 4,753,373 | 6/1988 | Seager | 222/391 X |

FOREIGN PATENT DOCUMENTS

| | | | |
|---|---|---|---|
| 3104726 | 8/1982 | Fed. Rep. of Germany | |
| 2512787 | 3/1983 | France | 222/386 |

Primary Examiner—Joseph J. Rolla
Assistant Examiner—Steve Reiss

[57] ABSTRACT

A package for containing and dispensing a viscous product such as toothpaste. The package includes a cylindrical container with a perforate spider member across an end of the container, such end serving as a dispensing end. A generally rigid, hemispherical pumping member with a discharge spout is reciprocatingly affixed to the dispensing end of the container, and is connected to a rodlike member which slidingly extends through the spider member and through a follower piston which is originally spaced away from the container. The container is operated by the application of hand pressure against the pumping member to move it toward the follower piston, with the pumping member being biased toward its original position upon the removal of the hand pressure by flexible portions of the rodlike member which engage the perforate spider and which are distorted by the movement of the rodlike member through the perforate spider. The follower piston is provided with a metallic clip which limits its movement in the container to movement toward the discharge end and which limits the movement of the rodlike member through the follower piston to movement away from the discharge end of the container.

22 Claims, 2 Drawing Sheets

DISPENSING PACKAGE FOR A VISCOUS PRODUCT

BACKGROUND OF THE INVENTION

1. Field Of The Invention

This invention relates to a hand-operable dispensing package for a viscous product such as a gel, a cream or a paste such as toothpaste. More particularly, this invention relates to a package of the foregoing character in which there is a mechanical connection between a hand-engageable pumping element at an end of a cylindrical container component of the package, and a piston which is initially positioned near the other end of the container and which is mechanically advanced toward the dispensing end as product is dispensed from the container. A package according to the present invention may be provided with striping characteristics, if desired.

2. Description Of The Prior Art

U.S. Pat. No. 4,413,759 (H. Mettenbrink) discloses a prior art hand-operable dispensing package for a viscous product in which the product is contained within a cylindrical portion of the package and is dispensed through a dispensing opening at one end of the container under the influence of a hand-operable pumping element at the one end, in combination with a unidirectionally movable piston which is initially positioned at the other end and which is mechanically linked to the pumping element so that it advances step by step toward the dispensing end of the container as product is dispensed therefrom. In a dispensing package according to this reference, the pumping element functions like a bellows, which requires that it have sufficient flexibility to be collapsible upon the application of a manual dispensing load thereto. This required flexibility limits the appropriate materials of construction for such pumping element to flexible materials such as ethylenevinlyacetate, and these materials are not well-suited to retain a fresh flavor in a packaged product in contact therewith. This is a particular disadvantage in a container intended for the packaging of a product such as toothpaste.

U.S. Pat. Nos. 4,437,591 (A. von Schukmann) and 4,461,403 (H. Prahs) and West German Offenlegungsschrift DE No. 3104726 A1 disclose other versions of hand-operable viscous product dispensing packages, each of which utilizes a pumping element at one end thereof that is mechanically linked to a unidirectionally movable piston which is initially positioned at the other end and which advances step by step toward the dispensing end. However, only the Prahs patent discloses a dispensing package of this general type which is described as having striping capabilities, and this patent teaches a rather complex, and, hence, expensive, structure for accomplishing such a result.

SUMMARY OF THE INVENTION

According to the present invention there is provided a dispensing package for a viscous product which includes a cylindrical, product-containing body portion, a rigid dispensing pump which is reciprocally and sealingly attached to the body portion at one end thereof, and a unidirectionally movable follower piston which is initially positioned at the other end of the body portion and which is mechanically linked to the dispensing pump for step by step movement toward the dispensing end of the container upon the actuation of the pump. The mechanical linkage between the dispensing pump and the follower piston is in the form of a rod an upper portion of which is grasped by the dispensing pump, and the lower portion of which is unidirectionally engaged by the follower piston for movement relative thereto in a direction which is the opposite of the direction of movement of the follower piston relevant to the body portion. A dispensing package according to the present invention also has a perforate member which extends transversely of the body portion, at a location near the dispensing end of the package, and through which the connecting rod that extends from the dispensing pump to the follower piston passes. The connecting rod has outwardly and downwardly extending flexible portions which engage the top of the perforate member to provide a biasing force to bias the connecting rod toward the dispensing end of the package, to thereby help to return it to its initial position upon the conclusion of a pumping cycle. The perforate member can be used to sub-divide the container into compartments which extend longitudinally of the body portion, and therefore parallel to the orientation of the connection rod, and when separate viscous product components are contained in the various compartments, for example, toothpaste compositions having different colors, the product which is dispensed from the container will have a variegated or striped appearance.

Accordingly, it is an object of the present invention to provide an improved dispensing package for a viscous product. More particularly, it is an object of the present invention to provide a simple, reliable and relatively inexpensive hand-operable dispensing package for a viscous product. Even more particularly, it is an object of the present invention to provide a multi-component, hand-operable dispensing package for a viscous product in which all of the components can be formed from materials that do not cause or permit any undesirable degradation in the properties of the packaged product. Even more particularly, it is an object of the present invention to provide a multi-component, hand-operable dispensing package of the aforesaid character which can be provided with striping characteristics, when desired.

For a further understanding of the present invention and the object thereof, attention is directed to the drawing and the following brief description thereof, to the detailed description of the preferred embodiment and to the appended claims.

DETAILED DESCRIPTION OF THE PREFERRED EMBODIMENT

Figures 1, 2:
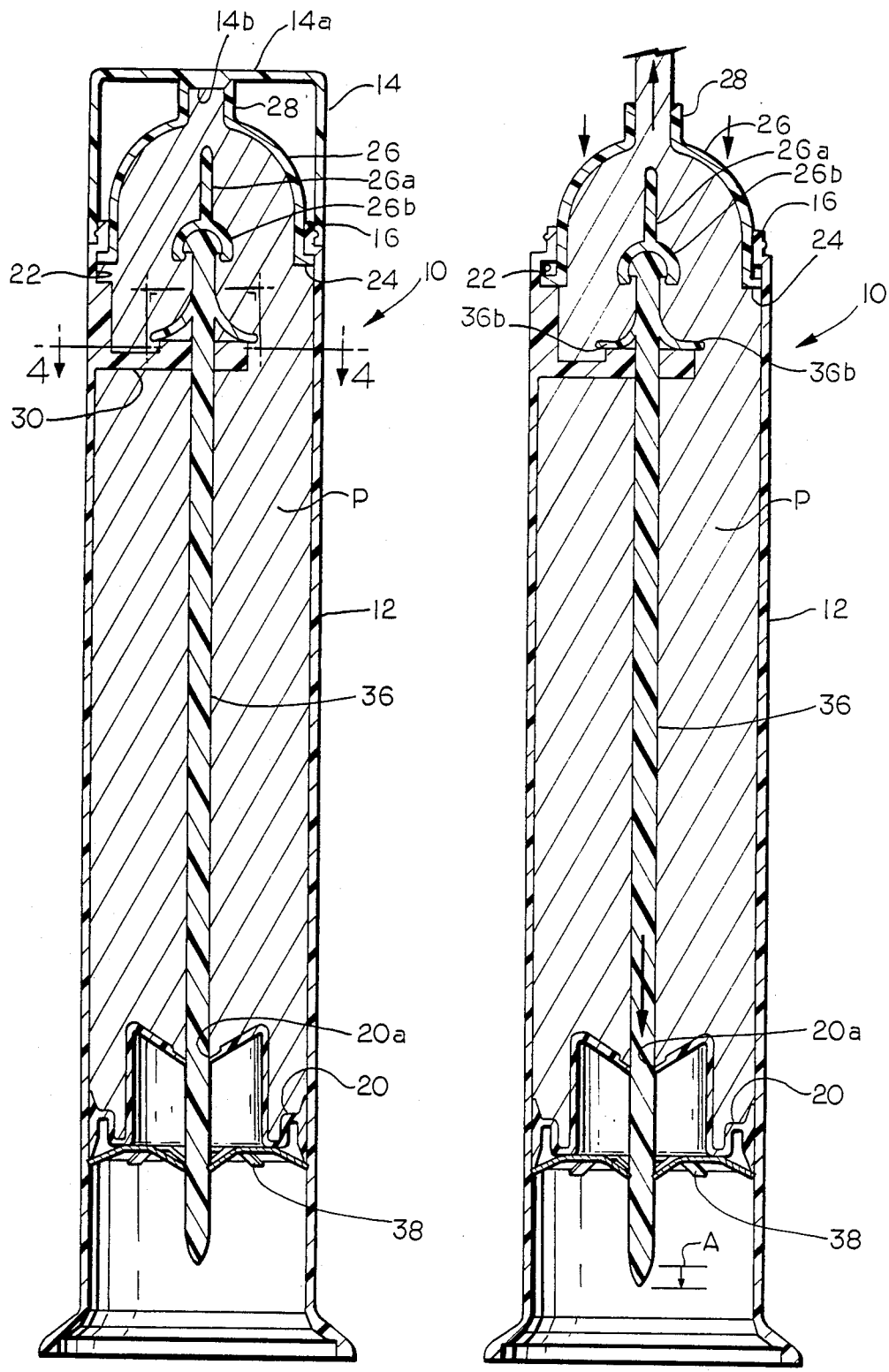
FIG. 1 is an elevational view, in cross section, of a preferred embodiment of a dispensing package according to the present invention.
FIG. 2 is a view similar to FIG. 1 showing the relationship between the components of such package during the dispensing of product therefrom.

As is shown in the various drawing figures, according to the present invention there is provided a dispensing package which is generally identified by reference numeral 10. The dispensing package 10 is suitable for the packaging and dispensing of a viscous product P from a mass of such priduct, for example, a gel, a cream, or a paste such as toothpaste, and is made up of a generally cylindrical container 12 which has a dispensing end 12a that is at the top of the dispensing package 10 in the illustrated upright orientation of the dispensing package 10. Further, the generally cylindrical container 12 also has a bottom end 12b. The dispensing package 10 further comprises an inverted, cup-shaped closure 14 which is frictionally attached to an axially extending flange 16 at the dispensing end 12a of the container 12 to close the dispensing package 10 until it is ready for first use and thereafter during periods of time when it is not in use.

The generally cylindrical container 12 is made up of a generally cylindrical body portion 18 which, preferably, is circular in cross-section. The body portion 18 of the cylindrical container 12 preferably is formed from a generally rigid thermoplastic material such as polypropylene or high density polyethylene by injection molding, so long as any such material is compatible with the product P to be packaged in contact therewith. The container 12 also includes a one-way movable piston 20 which is initially positioned within the body portion 18 near the bottom end 12b of the container 12, and the movable piston 20 is also preferably formed from a generally rigid polymeric material such as polypropylene or high density polyethylene.

The dispensing end 12a of the container 12 is open within the flange 16 and an inwardly facing radial groove 22, or a circumferential series of inwardly facing radial groove segments, is provided in the cylindrical body portion 18 of the container 12 at a location inwardly from, but near, the dispensing end 12a. The groove 22 receives an outwardly projectiong flange 24 of a generally hemispherically shaped pumping head 26. The depth of the groove 22, in a direction parallel to the longitudinal central axis of the container 12, is greater than the thickness of the flange 24 in the same direction, thus providing for limited reciprocating movement between the pumping head 26 and the container 12.

The pumping head 26, which is filled on its inside with the viscous product P, is formed from a relatively rigid polymeric material, and preferably a material which is compatible with and does not permit rapid degradation of the viscous product P, for example, polypropylene, and when the pumping head 26 is formed from such a material, for example, by injection molding, the pumping head 26 will have sufficient flexibility to permit it to be assembled to the container 12 by a snap fit. In any case, the pumping head 26 is provided with an axially extending annular spout portion 28 to permit the product P to be dispensed therethrough by hydraulic forces which result from the depression of the pumping head 26 relative to the container 12, by a distance shown by dimension A in FIG. 2. As is shown in FIG. 1, the closure 14 has a top panel 14a, and the top panel 14a is provided with a thickened portion 14b which is received in the opening in the spout portion 28 of the pumping head 26, to help to ensure that the dispensing package 10 does not leak when the closure 14a is in place. The body portion 18 of the container 12 is provided with an integrally formed spider member 30 which has an annular central portion 32 and a plurality of circumferentially spaced apart arms 34, shown as three of such arms, which extend radially outwardly from the spider member 30 to the inside of the body portion 18. A rodlike member 36, which is preferably formed from a generally rigid polymeric material such as polypropylene or high density polyethylene, is provided on the inside of the container 12 extending along the longitudinal central axis thereof. An upper portion of the rodlike member 36 passes through the annulus in the central portion 32 of the spider member 30 in sliding engagement therewith, and a lower portion of the rodlike member 36 passes through an opening 20a in the piston 20 for one-way sliding engagement therewith. A metallic clip 38 is attached to the bottom of the piston 20 to ensure that the motion of the piston 20 relative to the container 12 will only be upwardly in the container 12 and to ensure that the motion of the rodlike member 36 through the opening 20a in the piston 20 will only be downwardly therethrough. Thus, each time that the rodlike member 36 is moved downwardly it will move downwardly through the piston 20 and upon the retraction of the rodlike member 36 it will draw the piston 20 upwardly within the container 12 by a distance shown by dimension B in FIG. 3, which is equal in magnitude, but oppositely directed, to dimension A in FIG. 2.

Figure 3:
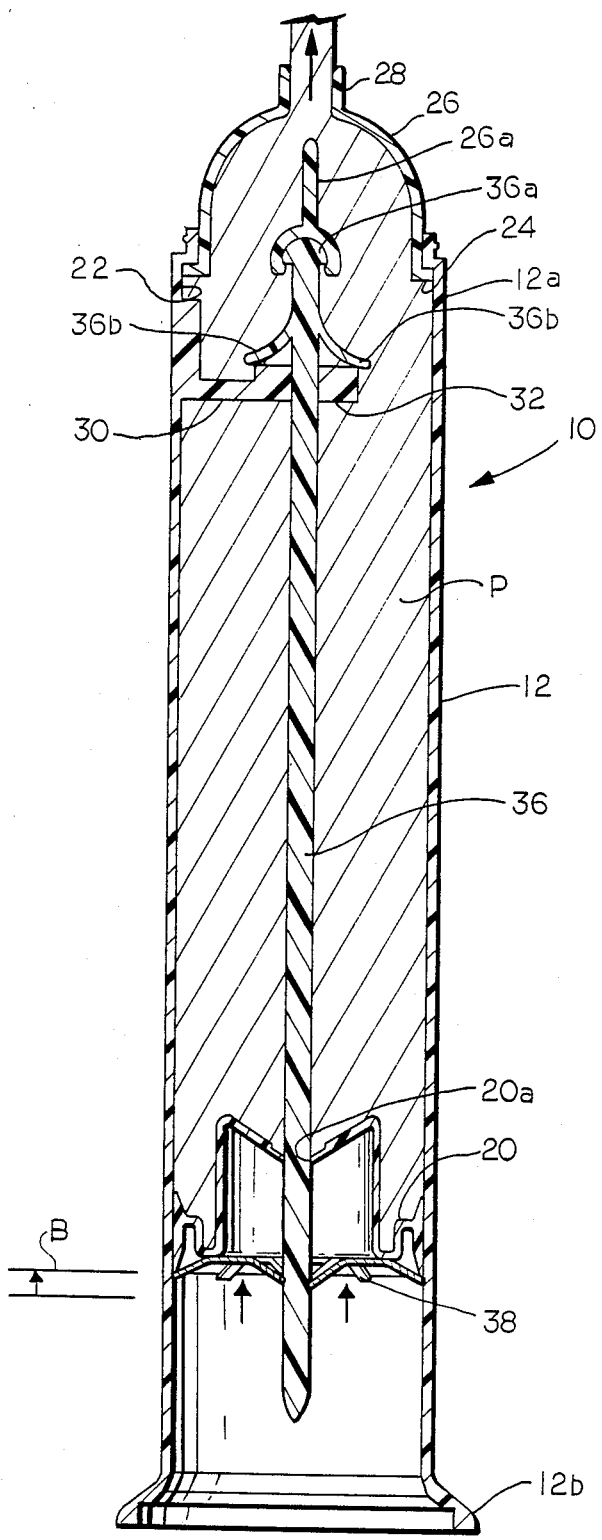
FIG. 3 is a view similar to FIGS. 1 and 2 showing the package thereof after the completion of the dispensing of the product therefrom and the return of the package to its initial condition in readiness for the further dispensing of product therefrom.
Figure 4:
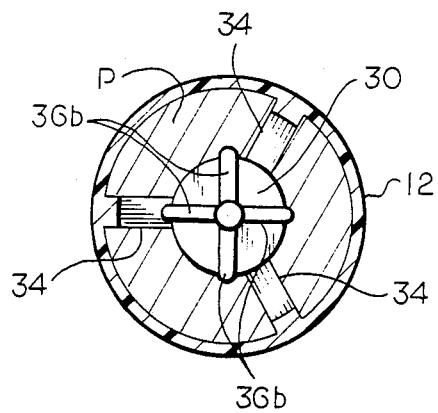
FIG. 4 is a cross sectional view taken on line 4—4 of FIG. 1.

The rodlike member 36 is coupled to the pumping head 26 for reciprocating movement relative to the container 12 with the pumping head 26 by providing the rodlike member with an enlarged, generally, hemispherically shaped head portion 36a at the top thereof and by providing the pumping head 26 with an internal, integrally formed spider portion 26a which supports a downwardly facing, generally hemispherically shaped pocket 26b. The pocket 26b of the spider portion 26a of the pumping head 26 frictionally engages the head portion 36a of the rodlike member 36. The return of the pumping head 26 and the rodlike member 36 to their original, FIG. 1, positions at the end of each pumping cycle is ensured by providing the rodlike member 36 with a plurality, shown as four, of integrally formed, outwardly and downwardly extending, circumferentially spaced flexible portions 36b which normally engage the top of the central portion 32 of the spider member of a container 12. The flexible portions 36b are distorted by the downward movement of the pumping head 26 and the rodlike member 36 during a pumping or dispensing cycle, as is shown in FIG. 2, to provide a biasing force that tends to return the pumping head 26 and the rodlike member 36 to the FIG. 1 position, but with the piston 20 now at a somewhat higher elevation within the container 12, as is shown in FIG. 3.

The container as heretofore described may be used in the dispensing of a single viscous product P and is advantageous in that regard, with respect to prior art single product dispensing containers, by virtue of the simplicity of its construction and by by virtue of the fact that the pumping head 26, in the preferred embodiment of the present invention, need not be flexible as in the case of the pumping members of various prior art dispensing packages, and can, thus, be formed from a material such a polypropylene which is compatible with toothpaste and other products that are dispensed from such packages, to thereby help prevent the degradation of such products, for example, flavor loss, when the flexible materials of the dispensing heads of prior art dispensing containers are used. It is, however, also contemplated that the pumping head 26 can also be formed from other generally rigid polymeric materials such as high density polyethylene if any such material is compatible with the product P which is to be packaged in contact therewith. In any case, by providing the container 12 of the present invention with vertically extending, circumferentially spaced webs (not shown) in alignment with the arms 34 of the spider member 30, it is possible to package different colors or compositions of product within the container 12, for example, toothpaste compositions of a different color, and to thereby provide for the dispensing of a striped or variegated product from the container 12 through the spout portion 28 of the pumping head 26. Further, by providing a helical flight, not shown, within the spout portion 28 of the pumping head 26, it is also possible to provide a swirling effect in the product which is dispensed from the package 10, which will be especially attractive when the package 10 is used for the dispensing of a striped or variegated product.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims.

What is claimed is:

1. A dispensing package for containing and dispensing a viscous product, said dispensing package comprising:
    a container having a generally cylindrical body portion, with an inside, a first end, and a second end, one of said first end and said second end serving as a dispensing end, said container being adapted to contain the viscous product and further having perforate means extending across said container at a location spaced from said dispensing end;
    generally rigid, concave pumping means slidingly secured to said container at said dispensing end, said pumping means being reciprocable with respect to said container along an axis extending between said first end and said second end and having an opening for dispensing the product therethrough;
    a follower piston positioned within said container away from said dispensing end, said follower piston being in contact with the viscous product and being adapted to move toward said dispensing end to move the viscous product toward said dispending end, said follower piston further having an opening extending therethrough;
    a rodlike member, said rodlike member being affixed to said pumping means and being reciprocable with said pumping means with respect to said container, said rodlike member slidingly extending through said perforate means of said container and extending through said opening in said follower piston, said rodlike member being movable through said follower piston as said pumping means move toward said follower piston and being unmovable with respect to said follower piston as said pumping means moves away from said follower piston; and
    biasing means normally biasing said pumping means away from said follower piston, said biasing means comprising flexible means formed integrally with said rodlike member and extending outwardly and toward said follower piston therefrom and engaging said perforate means of said container to be distorted as said pumping means moves toward said follower piston.

2. A dispensing package according to claim 1 wherein said flexible means comprises a plurality of circumferentially spaced apart, radially extending portions of said rodlike member.

3. A dispensing package according to claim 1 wherein said pumping means comprises a generally hemispherically shaped pumping member, said pumping member being formed from a generally rigid polymeric material of a composition which is compatible with the composition of the viscous product.

4. A dispensing package according to claim 3 wherein the viscous product is toothpaste and wherein said composition of said generally rigid, polymeric material is polypropylene.

5. A dispensing package according to claim 4 wherein said cylindrical body portion of said container has inwardly facing radial slot means spaced from, but near, said dispensing end, wherein said pumping member has outwardly projecting flange means which is received in said slot means, said slot means having a depth, parallel to the orientation of said rodlike member, which is greater than the thickness of said flange means, said pumping member being reciprocable with respect to said container by the movement of said flange means within said slot means.

6. A dispensing package according to claim 1 wherein said body portion of said container and said perforate means are formed integrally in a single piece from a relatively rigid polymeric material.

7. A dispensing package according to claim 6 wherein said perforate means comprises an annular central portion and a plurality of circumferentially spaced apart arms extending between said annular central portion and said body portion of said container.

8. A dispensing package for containing and dispensing toothpaste, said dispensing package comprising:
    a container having a generally cylindrical body portion, with an inside, a first end, and a second end, one of said first end and said second end serving as a dispensing end, said container being adapted to contain the toothpaste and further having perforate means extending across said container at a location spaced from said dispensing end, said cylindrical body portion having inwardly facing radial slot means spaced from, but near, said dispensing end;
    a generally hemispherically shaped rigid, pumping member slidingly secured to said container at said dispensing end, said pumping member being reciprocable with respect to said container along an axis extending between said first end and said second end and having an opening for dispensing the product therethrough, said pumping member being formed from polypropylene and having outwardly projecting flange means which is received in said slot means of said container;
    a follower piston positioned within said container away from said dispening end, said follower piston being in contact with the toothpaste and being adapted to move toward said dispensing end to move the toothpaste toward said dispensing end, said follower piston further having an opening extending therethrough;
    a rodlike member, said rodlike member being affixed to said pumping member and being reciprocable with said pumping member with respect to said container, said rodlike member slidingly extending through said perforate means of said container and extending through said opening in said follower piston, said rodlike member being movable through said follower piston as said pumping member moves toward said follower piston and being unmovable with respect to said follower piston as said pumping member moves away from said follower piston, said slot means of said container having a depth, parallel to the orientation of said rodlike member, which is greater than the thickness of said flange means of said pumping member, said pumping member being reciprocable with respect to said container by the movement of said flange means within said slot means; and biasing means normally biasing said pumping member away from said follower piston;

wherein said rodlike member has an enlarged head portion at an end near said dispensing end of said container and wherein said pumping member has engaging means frictionally engaging said head of said rodlike member.

9. A dispensing package according to claim 8 wherein said engaging means comprises means extending across said pumping member and having a pocket which faces toward said follower piston and which frictionally engages said enlarged head portion of said rodlike member.

10. A dispensing package according to claim 8 wherein said body portion of said container and said perforate means are formed integrally in a single piece.

11. A dispensing package according to claim 10 wherein said perforate means comprises an annular central portion and a plurality of circumferentially spaced apart arms extending between said annular central portion and said body portion of said container.

12. In combination with a mass of viscous product, a package containing said mass of viscous product for dispening of viscous product from said mass, said package comprising:

a container having a generally cylindrical body portion, with an inside, a first end, and a second end, one of said first end and said second end serving as a dispensing end, said container being adapted to contain said mass of viscous product and further having perforate means extending across said container at a location spaced from said dispensing end;

generally rigid, concave pumping means slidingly secured to said container at said dispensing end, said pumping means being reciprocable with respect to said container along an axis extending between said first end and said second end and having an opening for dispensing viscous product from said mass therethrough;

a follower piston positioned with said container away from said dispensing end, said follower position being in contact with said mass of viscous product and being adapted to move toward said dispensing end to move said mass of viscous product toward said dispensing end, said follower piston further having an opening extending therethrough;

a rodlike member, said rodlike member being affixed to said pumping means and being reciprocable with said pumping means with respect to said container, said rodlike member slidingly extending through said perforate means of said container and extending through said opening in said follower piston, said rodlike member being movable through said follower piston as said pumping means moves toward said follower position and being unmovable with respect to said follower piston as said pumping means moves away from said follower piston; and biasing means normally biasing said pumping means away from said follower piston, said biasing means of said package comprising flexible means formed integrally with said rodlike member and extending outwardly and toward said follower piston therefrom and engaging said perforate means of said container to be distorted as said pumping means move toward said follower piston.

13. A combination according to claim 12 wherein said flexible means of said package comprises a plurality of circumferentially spaced apart, radially extending portions of said rodlike member.

14. A combination according to claim 12 wherein said pumping means of said package comprises a generally hemispherically shaped pumping member, said pumping member being formed from a generally rigid polymeric material of a composition which is compatible with the composition of said viscous product.

15. A combination according to claim 14 wherein said viscous product is toothpaste and wherein said composition of said generally rigid, polymeric material is polypropylene.

16. A combination according to claim 15 wherein said cylindrical body portion of said container has inwardly facing radial slot means spaced from, but near, said dispensing end, wherein said pumping member has outwardly projecting flange means which is received in said slot means, said slot means having a depth, parallel to the orientation of said rodlike member, which is greater than the thickness of said flange means, said pumping member being reciprocable with respect to said container by the movement of said flange means within said slot means.

17. A combination according to claim 12 wherein said body portion of said container and said perforate means are formed integrally in a single piece from a relatively rigid polymeric material.

18. A combination according to claim 12 wherein said perforate means comprises an annular central portion and a plurality of circumferentially spaced apart arms extending between said annular central portion and said body portion of said container.

19. In combination with a mass of toothpaste, a package containing said mass of toothpaste for dispensing of toothpaste from said mass, said package comprising:

a container having a generally cylindrical body portion, with an inside, a first end, and a second end, one of said first end and said second end serving as a dispensing end, said container being adapted to contain said mass of toothpaste and further having perforate means extending across said container at a location spaced from said dispensing end, said cylindrical body portion having inwardly facing radial slot means spaced from, but near, said dispensing end;

a generally rigid, hemispherically shaped pumping member slidingly secured to said container at said dispensing end, said pumping member being reciprocable with respect to said container along an axis extending between said first end and said second end and having an opening for dispensing viscous product from said mass therethrough, said pumping member being formed from polypropylene and having outwardly projecting flange means which is received in said slot means of said container;

a follower piston positioned within said container away from said dispensing end, said follower piston being in contact with said mass of toothpaste and being adapted to move toward said dispensing end to move said mass of toothpaste toward said dispensing end, said follower piston further having an opening extending therethrough;

a rodlike member, said rodlike member being affixed to said pumping member and being reciprocable with said pumping member with respect to said container, said rodlike member slidingly extending through said perforate means of said container and extending through said opening in said follower piston, said rodlike member being movable through said follower piston as said pumping member moves toward said follower piston and being unmovable with respect to said follower piston as said pumping member moves away from said follower piston, said slot means of said container having a depth, parallel to the orientation of said rodlike member, which is greater than the thickness of said flange means of said pumping member, said pumping member being reciprocable with respect to said container by the movement of said flange means within said slot means; and biasing means normally biasing said pumping means away from said follower piston;

wherein said rodlike member of said package has an enlarged head portion at an end near said dispening end of said container and wherein said pumping member has engaging means frictionally engaging said head of said rodlike member.

20. A combination according to claim 19 wherein said engaging means comprises means extending across said pumping member and having a pocket which faces toward said follower piston and which frictionally engages said enlarged head portion of said rodlike member.

21. A combination according to claim 19 wherein said body portion of said container and said perforate means are formed integrally in a single piece.

22. A combination according to claim 21 wherein said perforate means comprises an annular central portion and a plurality of circumferentially spaced apart arms extending between said annular central portion and said body portion of said container.

* * * * *